(12) United States Patent
Cesar

(10) Patent No.: US 7,165,781 B2
(45) Date of Patent: Jan. 23, 2007

(54) INTERIOR PANELLING PART FOR AUTOMOTIVE VEHICLES

(75) Inventor: Nelly Cesar, Karlsruhe (DE)

(73) Assignee: Faurecia Innenraum Systems GmbH, Hagenbach (DE)

( * ) Notice: Subject to any disclaimer, the term of this patent is extended or adjusted under 35 U.S.C. 154(b) by 282 days.

(21) Appl. No.: 10/826,192

(22) Filed: Apr. 15, 2004

(65) Prior Publication Data

US 2004/0227333 A1 Nov. 18, 2004

Related U.S. Application Data

(63) Continuation-in-part of application No. PCT/EP02/11650, filed on Oct. 17, 2002.

(30) Foreign Application Priority Data

Oct. 17, 2001 (DE) .............................. 101 51 367

(51) Int. Cl.
*B60R 21/20* (2006.01)

(52) U.S. Cl. .................. 280/728.3; 280/743.2

(58) Field of Classification Search ............ 280/728.3, 280/728.2, 732, 743.2; 180/90; 296/70
See application file for complete search history.

(56) References Cited

U.S. PATENT DOCUMENTS

| | | | | |
|---|---|---|---|---|
| 5,072,967 A | * | 12/1991 | Batchelder et al. | 280/732 |
| 5,383,681 A | * | 1/1995 | Sato | 280/728.3 |
| 5,447,327 A | * | 9/1995 | Jarboe et al. | 280/728.3 |
| 5,590,903 A | * | 1/1997 | Phillion et al. | 280/728.3 |
| 5,913,534 A | * | 6/1999 | Klingauf | 280/728.3 |
| 6,092,836 A | * | 7/2000 | Saslecov | 280/730.1 |
| 6,129,378 A | * | 10/2000 | Goto et al. | 280/732 |
| 6,149,187 A | * | 11/2000 | Single et al. | 280/728.3 |
| 6,443,484 B2 | * | 9/2002 | Anglsperger | 280/728.3 |
| 2001/0045728 A1 | * | 11/2001 | Kansteiner et al. | 280/728.3 |

* cited by examiner

Primary Examiner—David R. Dunn
Assistant Examiner—Drew J. Brown
(74) Attorney, Agent, or Firm—Marshall & Melhorn, LLC

(57) ABSTRACT

An interior panelling part for automotive vehicles, has at least one weak point for forming an opening for the passage of an airbag, has a support and a pattern on the visible side. The pattern is applied on the support part. The support part has a recess in the region of a subsequent passage opening, which recess is bridged at least partially by a flap part made of a softer material than the support part. The pattern on the side orientated towards the support part is rear-foamed and the flap part is part of the rear-foaming. The rear-foaming has a harder foam in the region of the recess than in the remaining regions of the rear-foaming.

6 Claims, 2 Drawing Sheets

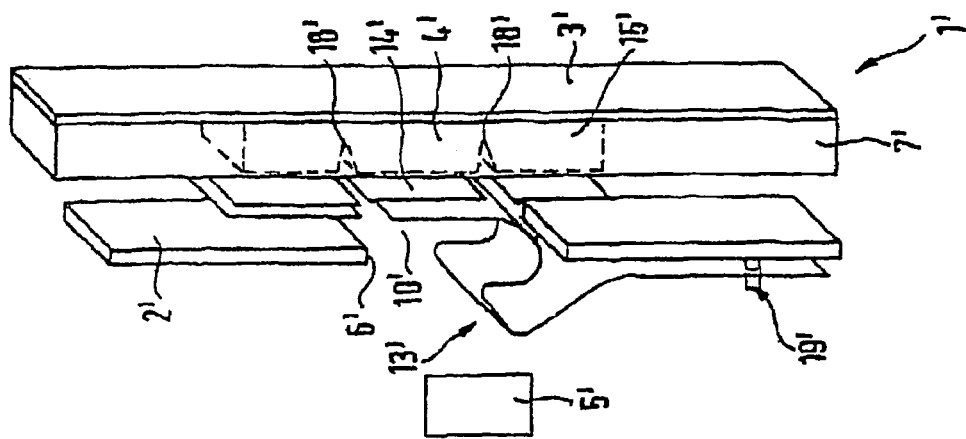
FIG. 1e
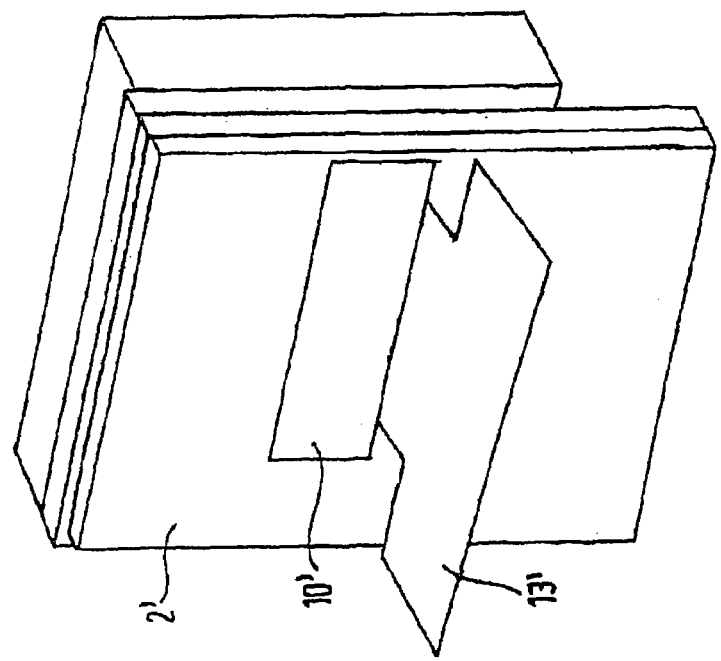
FIG. 1d2
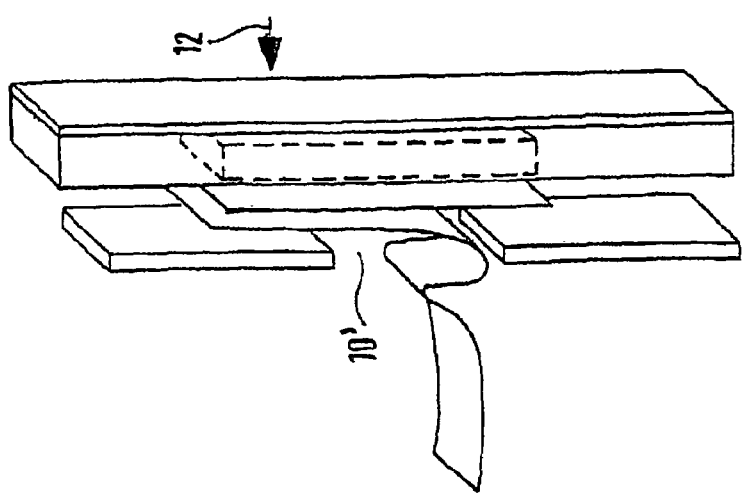
FIG. 1d1

INTERIOR PANELLING PART FOR AUTOMOTIVE VEHICLES

CONTINUING APPLICATION DATA

This application is a continuation-in-part application of international patent application Serial Number PCT/EP02/11650, which has an international filing date of Oct. 17, 2002. International patent application Serial Number PCT/EP02/11650 was pending as of the filing date of the present application. This application claims continuation-in-part status from international patent application Serial Number PCT/EP02/11650 under 35 USC §120 and 35 USC §365(c).

BACKGROUND OF THE INVENTION

The present invention relates to an interior panelling part for automotive vehicles, which parts have a weak point for forming an opening for the passage of an airbag. The present invention further relates to a method for production of an interior panelling part.

Interior panelling parts for automotive vehicles, which parts have a weak point for forming an opening for the passage of an airbag, are known. Such interior panelling parts have a support part made of a not readily deformable plastic material. This support part, in particular in higher-quality vehicles, is provided with a pattern on the visible side, which pattern is applied on the support part. The support part has at least one weak point for forming an opening for the passage of an airbag through the support part. This weak point is necessary in order that the airbag can actually enter into the vehicle interior through the support part. The support part is chosen to be continuous in the case of interior panelling parts according to the state of the art since it is hence achieved that the pattern has a homogeneous surface appearance without undulations or respectively dents.

It is however disadvantageous that, when releasing the airbag, in particular when releasing airbags if body parts of the vehicle occupants are located in the immediate vicinity, additional injuries can arise due to the parts of the support shooting out like a bullet.

The published European patent application EP 0 894 679 A2 reveals a column panelling for columns of automotive vehicles. The subject of the invention is a column panelling for columns of automotive vehicles comprising at least one opening region and at least one attachment region, the opening region comprising a thermoplastic plastic material with a Shore A hardness of 30–90.

The unexamined German application DE 199 62 551 A1 reveals an airbag arrangement in an interior panelling part of an automotive vehicle. The cover of an opening is formed there by a foam structure which is reinforced at least across half of the basic surface of the cover by a flexible reinforcement layer which is configured as a hinge for the foam structure.

The U.S. Pat. No. 5,458,361 reveals an inset and a method for production thereof for use as an airbag panelling in an automotive vehicle. This hereby concerns a flap arrangement which is produced in a multi-stage injection moulding method, the airbag opening being covered by a plastic material portion other than the plastic material support which surrounds this vicinity.

Finally, the unexamined German publication DE 38 16 876 A1 reveals a method for producing a multi-layer moulded piece, comprising a patterned layer disposed on the exterior, a thereto connected patterned layer made of foamable and hardenable material and also a soft, compressible insulation or respectively absorption layer.

SUMMARY OF THE INVENTION

An object therefore of the present invention is to produce an interior panelling part which can be laminated on the one hand also with soft materials without dents or respectively undulations and above all does not cause injuries to the vehicle occupants when released.

This object can be achieved by an interior panelling part according to the invention and by a corresponding production method according to the invention.

As a result of the fact that, in the case of the interior panelling part according to the invention, the support part has a recess in the region of the subsequent passage opening for the airbag, which recess is bridged at least partially by a flap part made of a softer material than the support part, it is achieved that no hard object can strike the vehicle occupants upon release of the airbag. Such a system is possible e.g. for so-called "knee bags" which are intended to protect the knees or respectively legs of vehicle occupants in the case of an accident. The flap part has the effect hereby that, on the one hand, the recess of the support part is bridged in the case of an unreleased airbag and the result is hence no formation of an undulation in the pattern in the region of the recess. On the other hand, due to the fact that the flap part is manufactured from a softer material than the support part, it is however achieved that even when the flap part strikes the body of vehicle occupants, no additional injuries result.

The pattern is hereby rear-foamed on the side orientated towards the support part, the flap part being part of the rear-foaming and the rear-foaming having a harder foam in the region of the recess than in the remaining regions of the rear-foaming. Advantageous developments of the present invention are indicated hereinbelow.

The interior panelling part according to the invention is particularly suitable for patterns made of textile materials. For example, material or carpet (e.g. a velvet carpet with a textile back) are possible hereby. These materials are usually constructed in particular in the foot space of the occupants of superior vehicles. It is however also possible to provide a foam film or even a leather layer as pattern. According to the type of pattern in the edge region of the recess, an additional weak point of the pattern also should hereby be provided in order to ensure a defined tearing-open of the interior panelling part. In order to increase the comfort (more pleasant tactuality), the pattern also can be foamed at the rear towards the support part in addition, on the one hand, good attachment of the pattern is hence offered and, on the other hand, yet further increased safety for vehicle occupants during a collision.

The constructional embodiment of the invention provides that the flap part is part of the rear-foaming. It is hereby necessary that, in the region of the recess, a sealing film which bridges the recess and is associated with the rear-foaming is provided. In addition, it is particularly advantageous that the flap part is connected to the support part via a hinge which is embodied as woven fabric or knitted fabric. This woven fabric can be injected on the one hand on the support part or respectively be glued or riveted or welded to the support part and, on the other hand, be foamed on the flap part. The woven fabric makes it possible that, upon explosion of the airbag, the flap part and also the connection to the support part folds downwardly in a quasi-defined manner and is not accelerated towards the body of occupants by shooting out.

A particularly advantageous variant of this constructional embodiment hereby provides that the rear-foaming has a harder foam in the region of the recess than in the regions of the remaining soft rear-foaming. In combination with a specific weakening of the foamed hinge woven fabric, it is hereby achieved that a defined break-out of the flap part is provided in the region of the penetration opening of the airbag. Hence, essentially a rupture is produced in the region of this interface, there is also no pulling-out as a result of shear forces and hence no detachment of adjacent rear-foaming regions which are attached to the support part.

The higher density of the rear-foaming in the region of the recess or respectively of the penetration opening for the airbag can be achieved advantageously by a cut foam part covering the recess, which part is placed firstly on the support part and subsequently the rear-foaming between the pattern and the support part is implemented, the support part and pattern being connected on the one hand and, on the other hand, the cut foam itself being bonded into the remaining rear-foaming.

BRIEF DESCRIPTION OF THE DRAWINGS

The invention is now explained with reference to a plurality of figures, which show:

FIG. 1a to 1e the production process of an embodiment of an interior panelling part according to the invention.

DETAILED DESCRIPTION OF THE PREFERRED EMBODIMENT

FIGS. 1a to 1e describe an embodiment 1' of the invention. Firstly, a possible production variant of this embodiment is hereby dealt with before the latter is described itself in more detail.

Figure 1C:
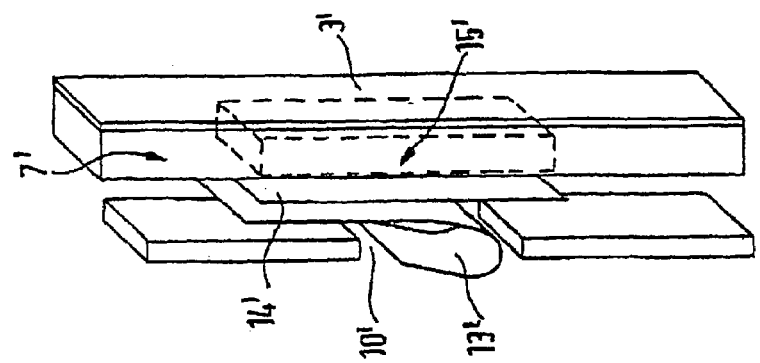
Figure 1B:
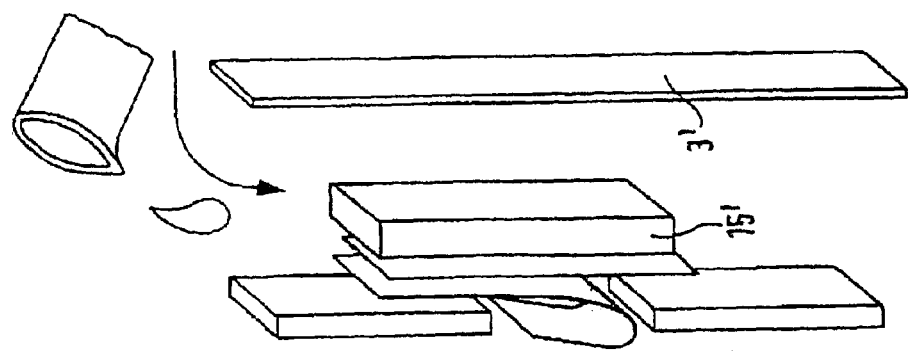
Figure 1A:
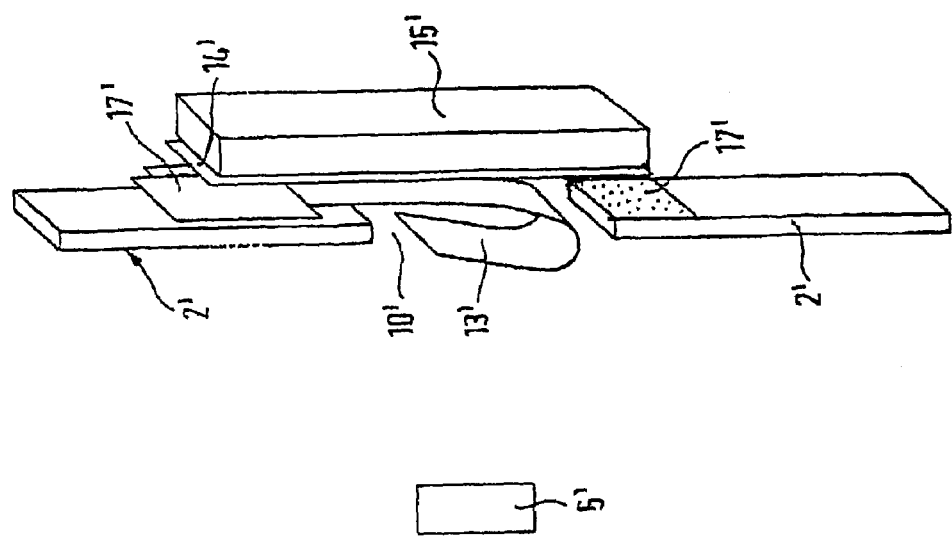

FIG. 1a shows the assembly of the attached hinge-woven fabric (13', 14', 15' and 17') upon the reinforcement 2'. The hinge-woven fabric comprises mainly a cut foam 15' and a woven fabric 13'. The two components are laminated together with a sealing film 14'. This hinge-woven fabric is attached or welded with adhesive 17' or respectively an adhesive film onto the reinforcement around the recess on the side orientated away from the uninflated airbag 5'.

FIG. 1b then shows how a rear-foaming process is implemented between the support part and a pattern 3', at the end of which the state to be detected in FIG. 1c is produced. It can be detected that, in the region of the recess 10', the cut foam part 15' is bonded into the remaining rear-foaming 7' and consequently forms a higher resistance to tearing than the normal foam and a connection between pattern 3' and rear-foaming 7' (also the sealing film 14' is associated with this rear-foaming) is produced.

FIGS. 1d1 and 1d2 show different views of a weakening process for forming a flap part 4'. For this purpose, a corresponding weakening is implemented with a hot or respectively cold knife or lasers from the non-visible side of the support 2' essentially along the edge of the recess 10'. In FIG. 1d2, it can be seen respectively that the woven fabric part 13', which is hereby severed in the upper region, has a reduced width in the passage region through the recess 10'. Finally, the result of the production process can be seen in FIG. 1e. The produced flap part 4' is located within the notches 18'. On the rear side, a part of the woven fabric 13' is firmly joined to this flap part 4' (either by adhesion or welded by lamination). What is definite at least is that the woven fabric 13' forms a complete inseparable unit with the flap part 4'. The other end of the woven fabric 13' is connected to the support part 14'. In addition to gluing, there is also the possibility hereby of screwing or respectively attachment by means of a rivet 19' or by ultrasonic welding.

According to the invention, the flap part 4', which contains the foamed cut foam 15', is made of a softer material than the support part 2'. However, this region is nevertheless harder than the normal region of the rear-foaming 7' in order hence to obtain a better rupture behaviour (e.g. shearing) in the region of the notches 18'. As a result of the fact that the flap part 4' is part of the rear-foaming, a very economical production is possible. It is in addition advantageous for the functioning of the airbag 5' if the edge region 6' of the recess 10' is not sharp-edged (i.e. for example is provided with radii).

In the case of the release of the airbag 5', due to the thereby arising pressure, rupture of the flap part in the region of the circumferential notches 18' results and rupture of the pattern 3' in this region. The airbag can pass through the recess 10', the flap part is however restrained by the woven fabric 13' and is deflected downwardly so that injuries to the vehicle occupants due to the flap part 4' shooting out cannot result.

A particularly advantageous embodiment provides that the flap part, which bridges the support part in the region of the recess, is part of a foaming which is disposed for example between a pattern and the support part. It is hereby particularly advantageous that the recess is initially covered with a sealing film on which for example a cut foam is placed and that subsequently foaming around the cut foam with soft foam is effected. This sealing film has the advantageous effect that, when foaming the cut foam, it is ensured that no soft foam passes through the airbag recess and as a consequence subsequent airbag function could be impaired. On the other hand, it is ensured that a relatively "soft" cut foam could be used so that, due to high impregnation, good coupling to the soft foam is produced (i.e. no separation which could represent a danger to the occupants). In addition, it is ensured by the sealing film that also the foamed cut foam does not disintegrate into a multitude of parts during the airbag detonation which likewise could fly through the vehicle interior like bullets so that this variant leads to a yet further increase in safety.

Before applying the woven fabric 13', the grooves 18' are introduced for example by means of laser weakening, subsequently the woven fabric 13' (see FIG. 2e) is attached to the carrier 2' (for example glued and/or riveted or attached by similar methods known to the person skilled in the art) with formation of a loop. In the case of release of the airbag module 5', the flap part 4' is firstly separated along the predetermined rupture lines 18'. Firstly, there occurs a linear movement of the flap part 4' by means of the airbag, which is expanding further, perpendicularly to the support 2' until the loop of the strip of woven fabric 13' is tensioned.

Thereafter, a pivot movement of the flap part 4' is initiated. The length of the loop is dimensioned such that the side of the flap part 4', which is orientated towards the airbag module, has passed through the surface of the pattern 3'.

A further advantageous embodiment would exist in the fact that the woven fabric part 13' is dimensioned such in its length that, at the end of the linear movement, the flap part 4' with its side orientated towards the airbag module 5' is removed by at least one flap thickness of the flap part 4' (including additional layers applied hereon) from the patterned surface 3' in order thus to prevent obstruction of the rotary movement of the flap part 4'.

The invention claimed is:

1. An interior panelling part for automotive vehicles, having at least one weak point for forming an opening for the passage of an airbag, having a support part and a pattern on the visible side, which pattern is applied on the support part, wherein:
   the support part has a recess forming an aperture in the region of said opening, which recess is bridged at least partially by a flap part made of a softer material than the support part;
   the pattern on the side orientated towards the support part is rear-foamed;
   the flap part is part of the rear-foaming;
   the rear-foaming has a harder foam in the region of the recess than in the remaining regions of the rear-foaming; and
   wherein, in the region of the recess, a sealing film bridging the recess and associated with the rear-foaming on a back side of the rear-foaming which is orientated towards the support part is provided such that the aperture formed by the recess is closed by the sealing film.

2. The interior panelling part according to claim 1, wherein the pattern is embodied as textile material, as a foamed film or as a leather layer.

3. The interior panelling part according to claim 1, wherein the recess has an edge region and the rear-foaming in the edge region of the recess is weakened essentially circumferentially.

4. The interior panelling part according to claim 1, wherein the flap part is connected to the support part via a hinge embodied as woven fabric, which hinge is attached to the support part and to the flap part.

5. The interior panelling part according to claim 4, wherein the recess has an edge region, and the woven fabric in the edge region of the recess is narrowed.

6. A method for producing an interior panelling part according to claim 1, wherein, in the region of the recess, a sealing film closing the recess and a cut foam part covering the recess is placed on the support part and a rear-foaming is implemented subsequently between the pattern and the support part, which rear-foaming bonds the support part and the pattern and penetrates the cut foam at least partially and is bonding with the rear-foaming, so that the produced rear-foaming has a harder foam in the region of the recess than in the remaining regions of the rear-foaming.

* * * * *